Aug. 15, 1933.    A. E. WRIGHT    1,922,564
ROD CONNECTER
Filed July 1, 1932    3 Sheets-Sheet 1
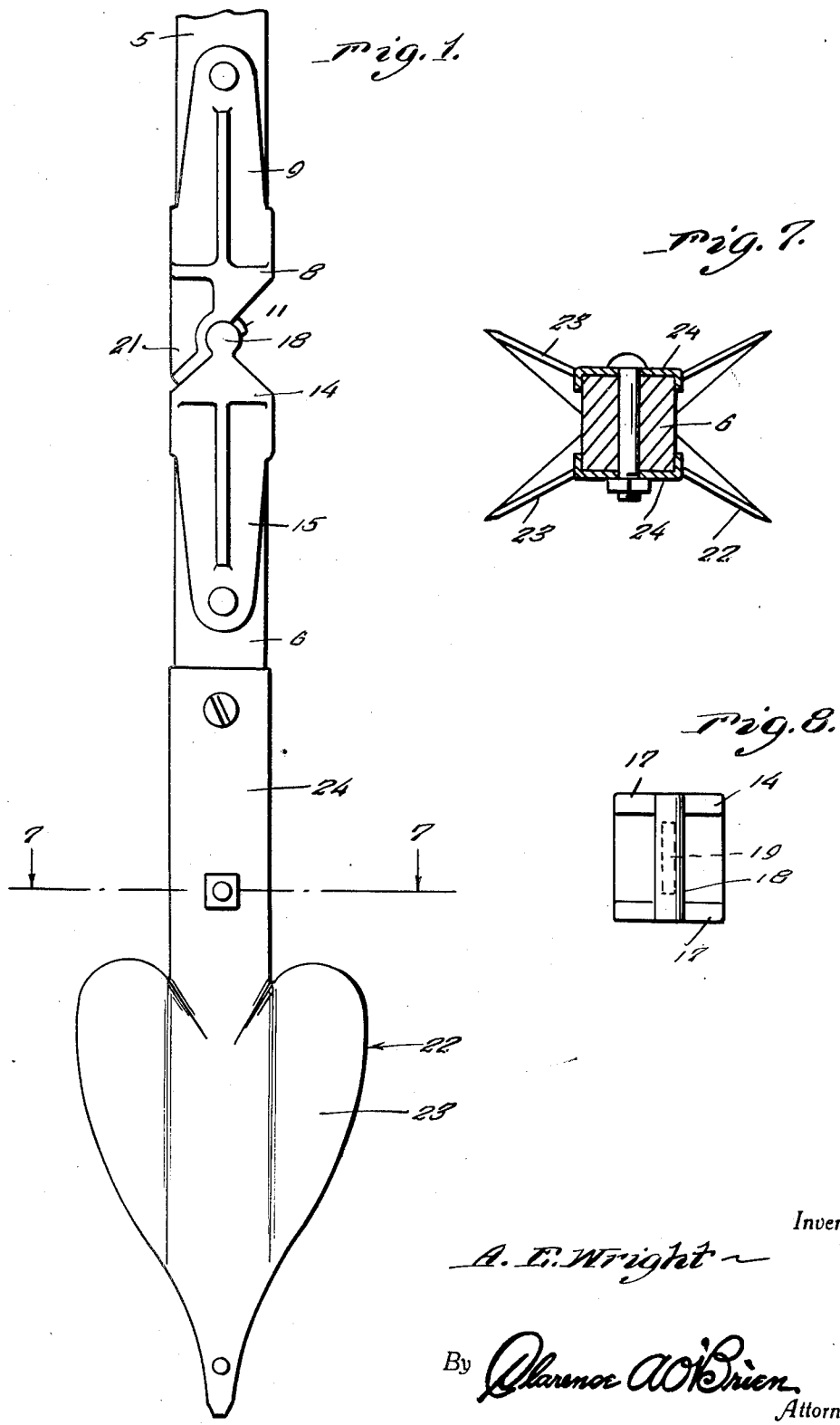
Inventor
A. E. Wright
By Clarence A. O'Brien
Attorney Aug. 15, 1933. A. E. WRIGHT 1,922,564
ROD CONNECTER
Filed July 1, 1932 3 Sheets-Sheet 2
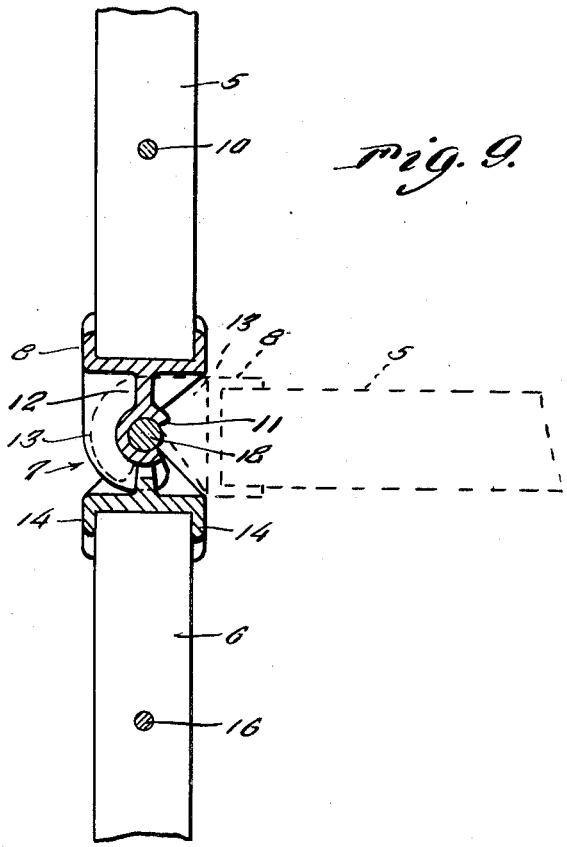
Fig. 9.
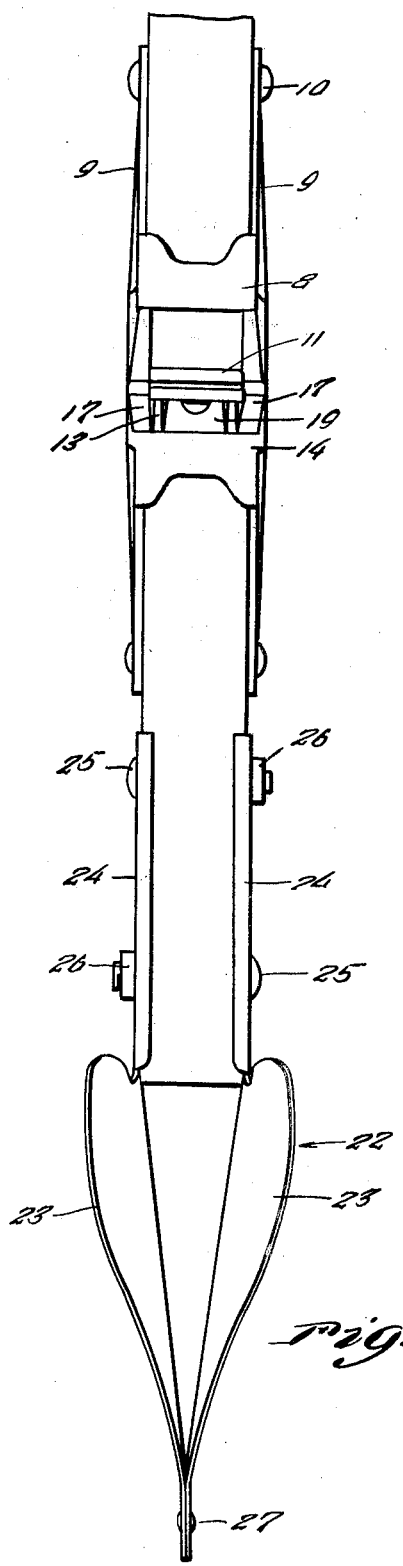
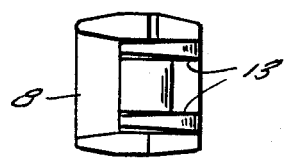
Fig. 10.
Fig. 2.
Inventor
A. E. Wright
By Clarence A. O'Brien
Attorney

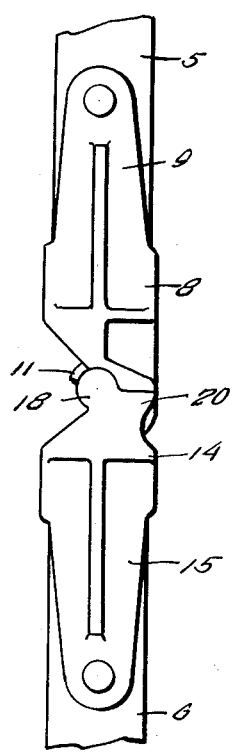
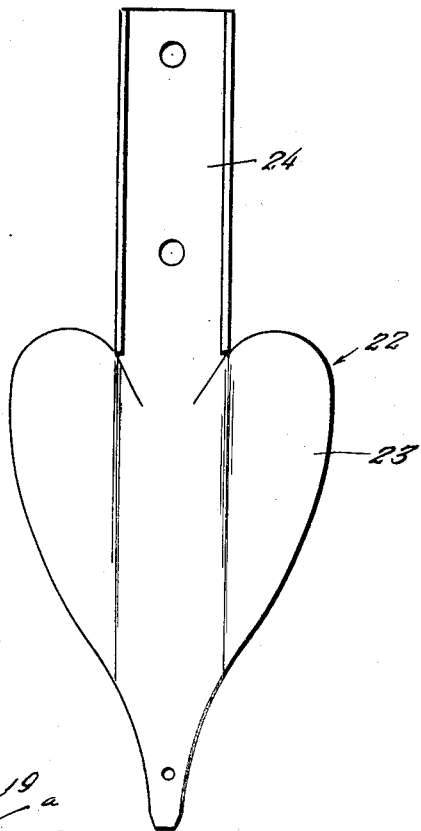
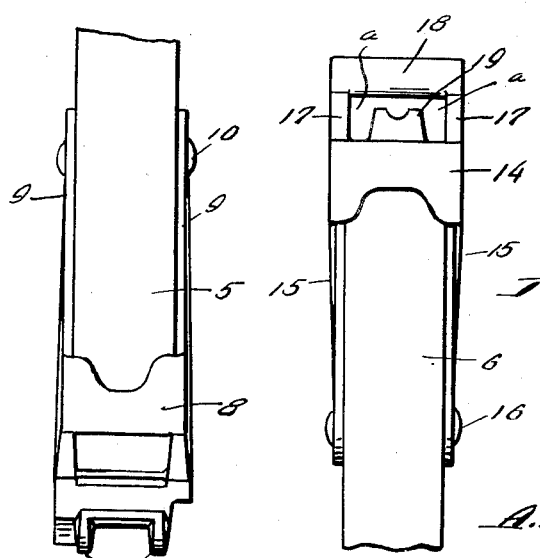

Patented Aug. 15, 1933

1,922,564

UNITED STATES PATENT OFFICE 1,922,564

ROD CONNECTER

Aubern E. Wright, Nappanee, Ind.

Application July 1, 1932. Serial No. 620,481

1 Claim. (Cl. 287—103)

This invention appertains to new and useful improvements in pipe and rod connecters and more particularly to a novel connection for rod sections, particularly those that are used in pipe cleaning implements and the like.

The principal object of the invention is to provide a rod connecter wherein the sections can be connected by bringing the same together at a predetermined angle.

Another important object of the invention is to provide a pivotal rod connecter wherein the rod sections can be swingably connected together by introducing one to the other at a predetermined angle.

These and various other important objects and advantages of the invention will become apparent to the reader of the following specification.

In the drawings:—

Figure 1 represents the side elevational view of the novel showing.

Fig. 2 represents a side elevational view of the showing looking at the side thereof at right angles to the side shown in Fig. 1.

Fig. 3 represents a fragmentary side elevational view of the showing looking at the opposite side from that shown in Fig. 1.

Fig. 4 represents a fragmentary side elevational view showing one section of the joint.

Fig. 5 represents a fragmentary side elevational view showing the complementary section of the joint.

Fig. 6 represents a side elevational view of one section of the scraper which may be used in conjunction with the invention.

Fig. 7 represents a sectional view taken substantially on line 7—7 of Fig. 1.

Fig. 8 represents an end elevational view of the insertible end of the joint.

Fig. 9 represents a sectional view taken substantially on line 9—9 of Fig. 2.

Fig. 10 represents an end elevational view of the receiving end of the joint.

Referring to the drawings wherein like numerals designate like parts, it can be seen that numerals 5—6 represents rod sections between which is the breakable joint generally referred to by numeral 7. On the section 5 is the receiving joint section while on the rod section 6 is the insertible joint section.

In carrying out the present invention, the receivable joint section consists of a socket construction 8 having a pair of elongated parallel legs 9—9 which are disposed against opposite sides of the section 5 and secured to the section by a rivet or like member 10.

The socket structure 8 is provided with a slit barrel 11 connected to the structure 8 by the web 12 and merging with this barrel 11 are the hook-shaped ribs 13 extending a substantial distance around the aforementioned barrel 11.

On the section 6 is a socket structure 14 having leg portions 15—15 extending therefrom, and these are extended to the section 6 by a rivet or bolt 16. On the socket structure 14 are outstanding members 17—17 which are abridged by a cylindrical member 18. Projecting into the space between the outstanding members 17—17 and from the socket structure 14 is the lug 19 defining spaces A—A in which the hook-like structure 13—13 on the socket structure 8 engage when the cylindrical member 18 is located in the valve 11.

Now referring to Fig. 6, it can be seen that at one end of the cylindrical member 18 is located a laterally disposed abutment 20 which when the member 18 is inserted into the barrel 11, abuts the tail piece 21 extending from the socket structure 8. This tail piece 21 abuts the socket structure 14 as shown in Fig. 1 and obviously this abutment 20 serves to limit movement of the cylindrical member 18 in a direction inwardly of the barrel 11 so that the hook-like members 13—13 will be registering with the openings A—A, (see Fig. 5), at opposite sides of the tongue or lug 19.

It can now be seen that the sections are brought to the right angular relation shown in Fig. 9, one section being in dotted lines, whereupon the member 18 is inserted into the barrel 11. The abutment 20 limits the inward movement of the member 18 and when the hook-like members 13—13 are registered with the openings A—A, the wires or rod sections 5—6 are swung to the alined position shown in Fig. 9 in which position the hooks members 13—13 are engaged within the openings A—A and this prevents longitudinal displacement of the barrel 11 on the member 18.

By way of illustration in the drawings, numeral 22 represents a cleaner or scraper head consisting of a pair of arc-shaped members 23—23 cut from sheet metal. Each is provided with a leg extension 24 and these leg extensions are secured to one of the rod sections 6 by bolts 25 and nuts 26.

The reduced portions of the arc-shaped members 23—23 are riveted together as at 27. The arc members 23 are further bent longitudinally so that the wing portions are disposed in angular relation to each other as in the manner substantially shown in Fig. 7.

While the foregoing specification sets forth the invention in specific terms, it is to be understood that numerous changes in the shape, size and materials may be resorted to without departing from the spirit and scope of the invention as claimed hereinafter.

Having thus described my invention what I claim as new is:—

A joint of the character described comprising a pair of bar sections having opposed ends, one of said sections being provided with a slotted barrel, a pair of guide flanges spaced on the said barrel and projecting upwardly therefrom, a lug on the end of the other section, a cross pin on the end of the last mentioned section for disposition in the said slotted barrel, said lug on the last mentioned section being adapted for disposition between the said guide flanges to prevent longitudinal motion of the pin in the barrel at certain positions of the sections with respect to each other, a portion of each of the said flanges being removed adjacent the slotted portion of the barrel so as to permit longitudinal displacement of the pin by freeing the said lug from the said flanges.

AUBERN E. WRIGHT.